(12) United States Patent
Lee et al.

(10) Patent No.: US 9,559,740 B2
(45) Date of Patent: Jan. 31, 2017

(54) MOBILE TERMINAL CASE AND MOBILE TERMINAL

(71) Applicant: LG ELECTRONICS INC., Seoul (KR)

(72) Inventors: Hyunok Lee, Seoul (KR); Mansoo Sin, Seoul (KR); Youngsok Lee, Seoul (KR); Jeunguk Ha, Seoul (KR); Yunghee Kim, Seoul (KR); Byungki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/620,572

(22) Filed: Feb. 12, 2015

(65) Prior Publication Data

US 2015/0311940 A1    Oct. 29, 2015

(30) Foreign Application Priority Data

Apr. 29, 2014 (KR) .................. 10-2014-0051563

(51) Int. Cl.
*H04M 1/00* (2006.01)
*H04B 1/3888* (2015.01)

(52) U.S. Cl.
CPC .................. *H04B 1/3888* (2013.01)

(58) Field of Classification Search
CPC . H04B 1/3888; H04M 1/0266; H04M 1/1266; H04M 1/72563; A45C 11/00; H05K 5/0017; H05K 5/03
USPC ............. 455/575.1, 575.8, 41.1, 41.2, 41.3
See application file for complete search history.

(56) References Cited

U.S. PATENT DOCUMENTS

| 5,584,054 A | * | 12/1996 | Tyneski | H04M 1/0214 455/566 |
|---|---|---|---|---|
| D716,286 S | * | 10/2014 | Ahn | D14/250 |
| 2008/0062348 A1 | * | 3/2008 | Sasuga | G02F 1/133308 349/58 |
| 2011/0065474 A1 | * | 3/2011 | Won | H02J 7/355 455/556.1 |
| 2012/0249295 A1 | * | 10/2012 | Yeung | G06F 3/04883 340/5.54 |
| 2012/0250241 A1 | * | 10/2012 | Minemura | G06F 1/1641 361/679.21 |
| 2013/0194222 A1 | * | 8/2013 | Hong | G06F 1/1626 345/173 |
| 2014/0128131 A1 | * | 5/2014 | Sin | H04M 1/185 455/575.8 |
| 2014/0185206 A1 | * | 7/2014 | Kim | H05K 5/0017 361/679.01 |
| 2014/0204511 A1 | * | 7/2014 | Oh | G06F 1/1632 361/679.01 |
| 2014/0208269 A1 | * | 7/2014 | Boyana | H04M 1/66 715/835 |

(Continued)

*Primary Examiner* — Md Talukder
(74) *Attorney, Agent, or Firm* — KED & Associates, LLP

(57) ABSTRACT

There is disclosed a polio case including a back cover coupled to a rear surface of a mobile terminal, a quick cover connected to a predetermined portion of the back cover, to cover a front surface of the mobile terminal, a touch unit provided in an inner portion of the quick cover, the touch unit formed of a conductive material, wherein a touch sensor provided in the front surface of the mobile terminal contacts with the touch unit, when the quick cover is closed, and capacity of the touch sensor changes. The polio case may provide the display unit with a screen matching a shape of the quick cover.

14 Claims, 24 Drawing Sheets

(56) References Cited

U.S. PATENT DOCUMENTS

| | | | |
|---|---|---|---|
| 2014/0274214 A1* | 9/2014 | Kim | H04M 1/0266 |
| | | | 455/566 |
| 2014/0292589 A1* | 10/2014 | Park | H01Q 1/243 |
| | | | 343/702 |
| 2015/0138021 A1* | 5/2015 | Konu | H01Q 1/243 |
| | | | 343/702 |
| 2015/0172430 A1* | 6/2015 | Sin | G06F 1/1662 |
| | | | 455/566 |
| 2015/0229754 A1* | 8/2015 | Won | H04M 1/72563 |
| | | | 455/575.8 |
| 2015/0271308 A1* | 9/2015 | Roessler | H04M 1/0202 |
| | | | 455/575.8 |
| 2015/0280770 A1* | 10/2015 | Rhee | H04B 1/3888 |
| | | | 455/575.8 |
| 2015/0311940 A1* | 10/2015 | Lee | H04B 1/3888 |
| | | | 455/575.8 |
| 2015/0346779 A1* | 12/2015 | Chae | G06F 1/1677 |
| | | | 715/773 |

* cited by examiner

FIG. 9
(a)
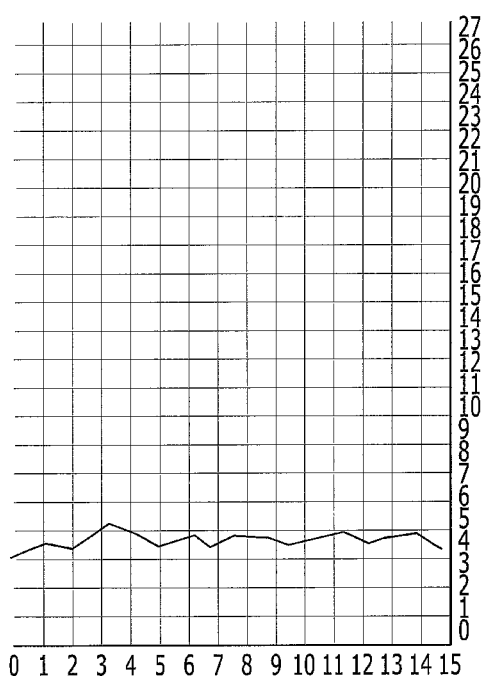
(b)
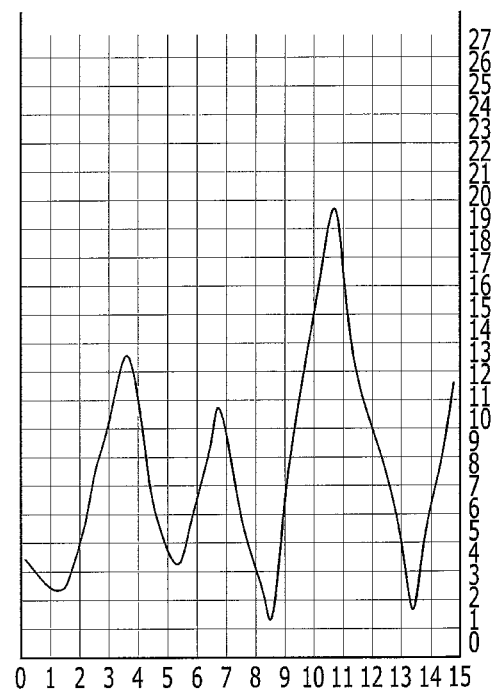

MOBILE TERMINAL CASE AND MOBILE TERMINAL

CROSS-REFERENCE TO RELATED APPLICATION

This application claims priority under 35 U.S.C. §119 to Korean Application No. 10-2014-0051563 filed on Apr. 29, 2014, whose entire disclosure is hereby incorporated by reference.

BACKGROUND

1. Field

Embodiments of the present disclosure relates to a mobile terminal case including a touch unit having information on a polio case and a display for recognizing the touch unit.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

As functionality of such mobile terminals is diverse, various types of parts are loaded and such parts are integrated to reduce the overall size and the mobile terminals results in having a disadvantage of vulnerability to an external shock. Especially, a display provided in a front portion of a mobile terminal tends to be getting larger and such a display happens to break easily and usage of a case including a quick cover for protecting a front surface is increasing.

BRIEF DESCRIPTION OF THE DRAWINGS

The embodiments will be described in detail with reference to the following drawings in which like reference numerals refer to like elements wherein:

FIG. 9 is a graph to describe a scope of changes of capacity based on whether to be grounded or not;

DETAILED DESCRIPTION

Figure 1A:
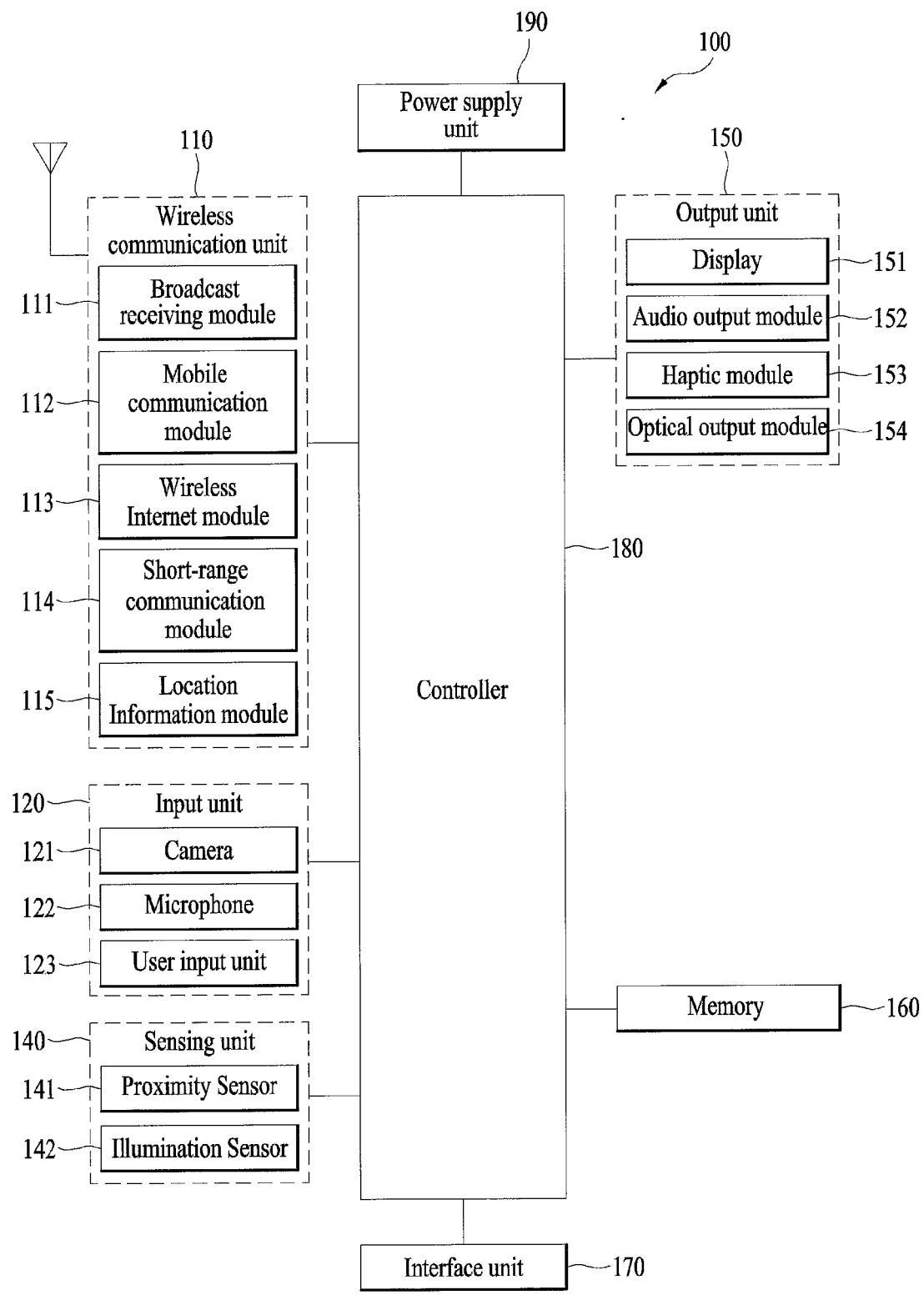
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1A is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Figure 1B:
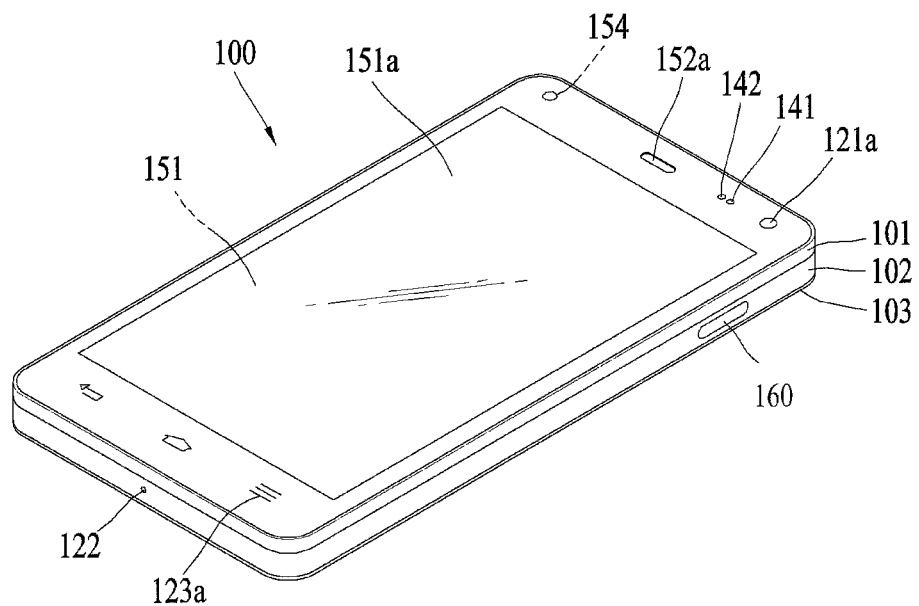
FIG. 1B is a front view of the mobile terminal.
Figure 1C:
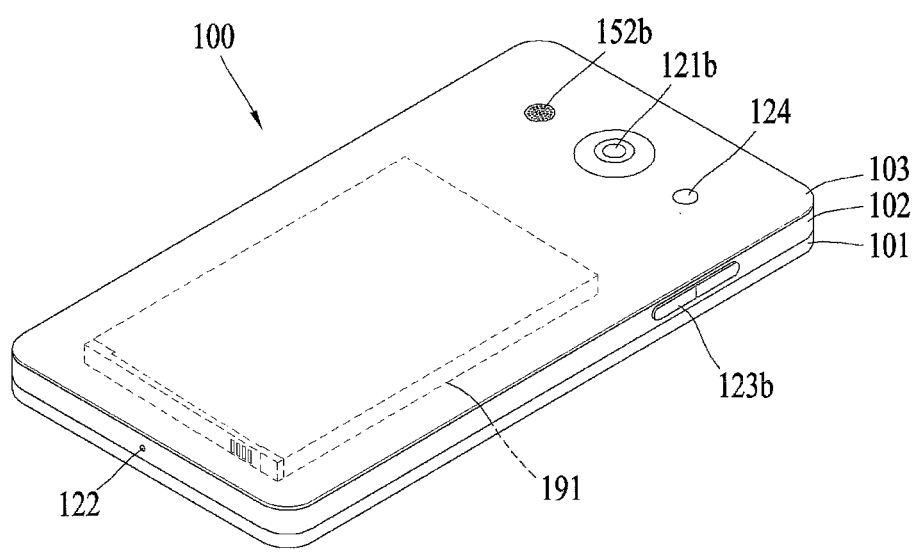
FIG. 1C is a rear view of the mobile terminal.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

Figure 2:
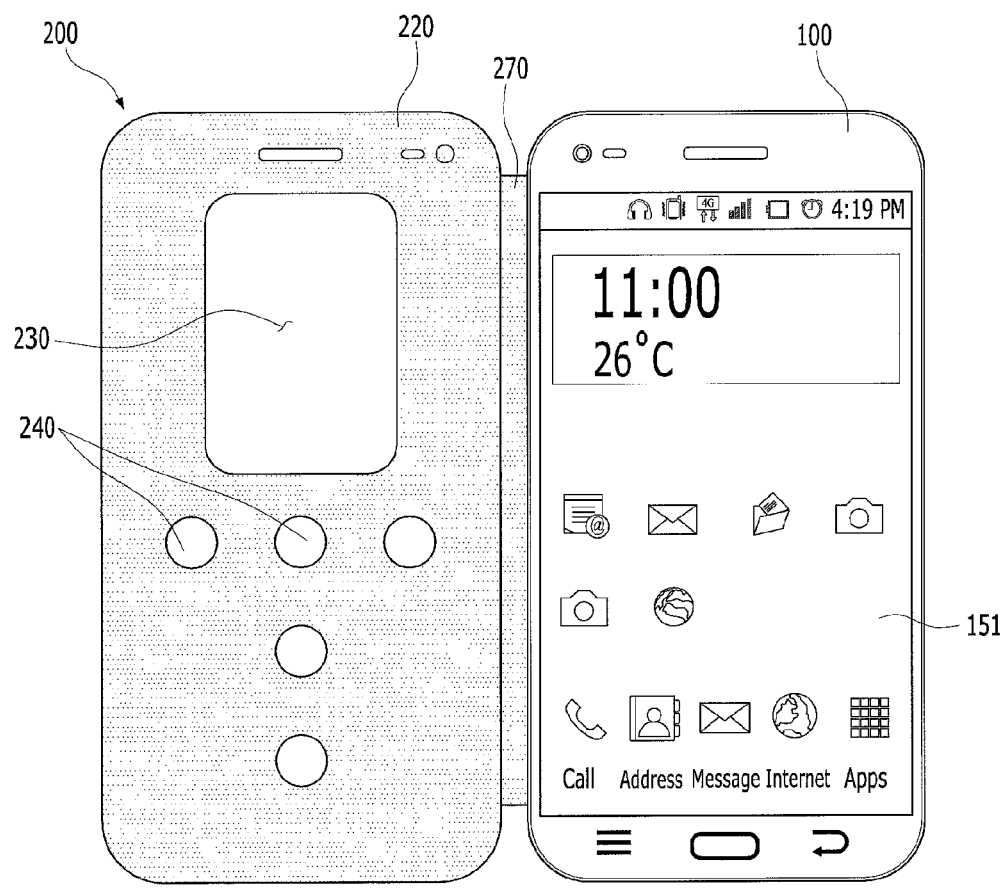
FIGS. 2 and 3 are diagrams illustrating a mobile terminal and a polio case in accordance with a first embodiment of the present disclosure.
Figure 3:
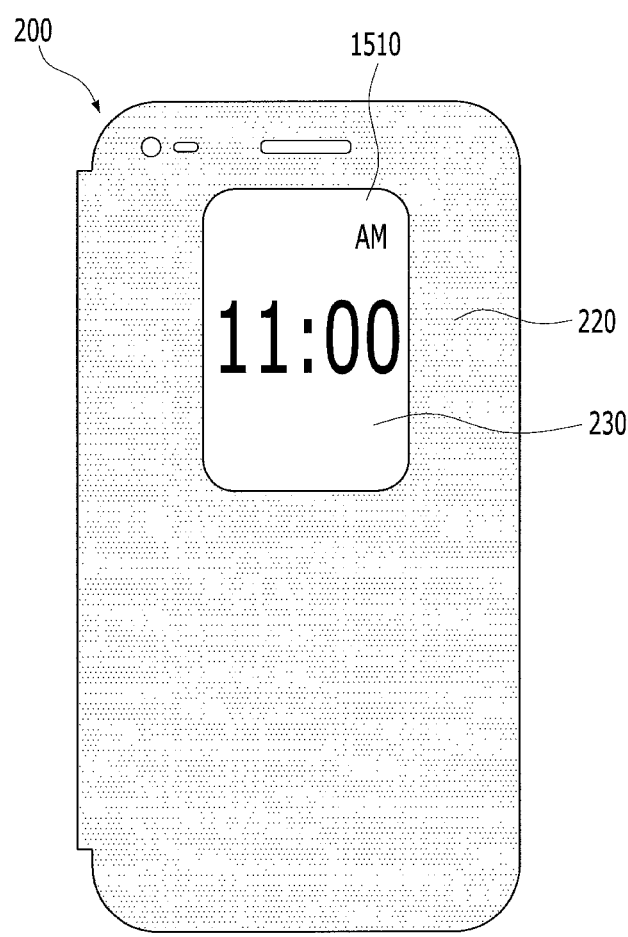

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen FIGS. 2 and 3 are diagrams illustrating a mobile terminal and a polio case in accordance with a first embodiment in another aspect of the present disclosure. To protect the mobile terminal 100 from breakage caused by an external shock, the mobile terminal 100 may further include a protection case 200 coupled to an outer portion of a case 101 and 102 provided in the mobile terminal 100. A polio case may also be referred to as a folio case.

A conventional protection case is employed to cover a rear surface or a lateral surface of the mobile terminal 100, so as to improve use convenience of the display unit 151 provided in the front surface of the mobile terminal 100, with exposing the display unit 151. However, the display unit 151 and the glass coupled to the front surface of the display unit 151 are vulnerable to a shock and they are easily breakable. To protect the front surface of the mobile terminal 100 as well, a polio case 200 including a quick cover 220 for covering the display unit 151 may be used.

The polio case 200 includes a back cover 210 coupled to the rear surface of the mobile terminal 100 and a quick cover 220 for selectively covering the front surface of the display unit 151. The back cover 210 and the quick cover 220 are rotatably connected with each other via a rotary member 270 formed of a flexible material.

The quick cover 220 covers the front surface of the display unit 151 to protect the display unit 151 and opens the quick cover 220 to open the display unit when the user uses the mobile terminal 100.

When closing the quick cover 220, the user cannot use the display unit 151. A magnet and a hall sensor may be used to automatically turn off the display unit 151 only when the quick cover 220 is closed even without pressing a power button to inactivate the display unit 151.

The hall sensor is provided in a specific portion of the mobile terminal 100 and the magnet is provided in the quick cover 220. When the hall sensor senses the magnet of the quick cover 220, the display unit 151 is inactivated.

Recently, a predetermined portion of the quick cover 220 is eliminated and a quick window 230 is formed in the portion, such that only a quick window display 1510 corresponding to the quick window 230 can be activated and the other display of the display unit 151 can be inactivated. Using the quick window display 1510, simple information such as the time and the weather may be transmitted even without opening the quick cover 220.

At this time, the hall sensor senses only the approach of the magnet. When the hall sensor senses a magnetic force, a quick window display 1510 with a preset size is output on a preset position. Accordingly, the user cannot configurate a quick window 230 with a size and a shape desired by the user and only use a quick window 230 with a preset size and shape.

Therefore, the present disclosure provides a polio case 200 having a quick window 230 with a shape desired by the user and a mobile terminal 100 which is useable with the polio case 200 coupled thereto.

Referring to FIG. 2, the quick cover 220 according to the embodiment of the present disclosure includes a quick window 230 and a touch unit 240 is provided in an inner surface of the quick cover 220. The touch unit 240 is formed of a conductive material and it changes capacity of a touch sensor, when contacting with a touch sensor provided in the display unit 151. A plurality of touch units 240 may be provided as shown in FIG. 2.

When the touch sensor 137 provided in the mobile terminal 100 senses the contact of the touch unit 240, a controller 180 shown in FIG. 3 activates a preset portion of the display unit 151 corresponding to the quick window 230 and inactivates the other portion of the display unit 151.

In other words, the mobile terminal according to the present disclosure includes the touch sensor for sensing the touch unit 240 provided in the inner surface of the quick cover 220 and the controller 180 for activating only the quick window display 1510 of the display when sensing the touch unit 240 and for inactivating the other display.

The controller 180 may control the display unit 151 to output the information displayed on the quick window display 1510, which includes the size, position and color of the quick window display 1510 based on the positions and number of the touch units 240.

Figure 4:
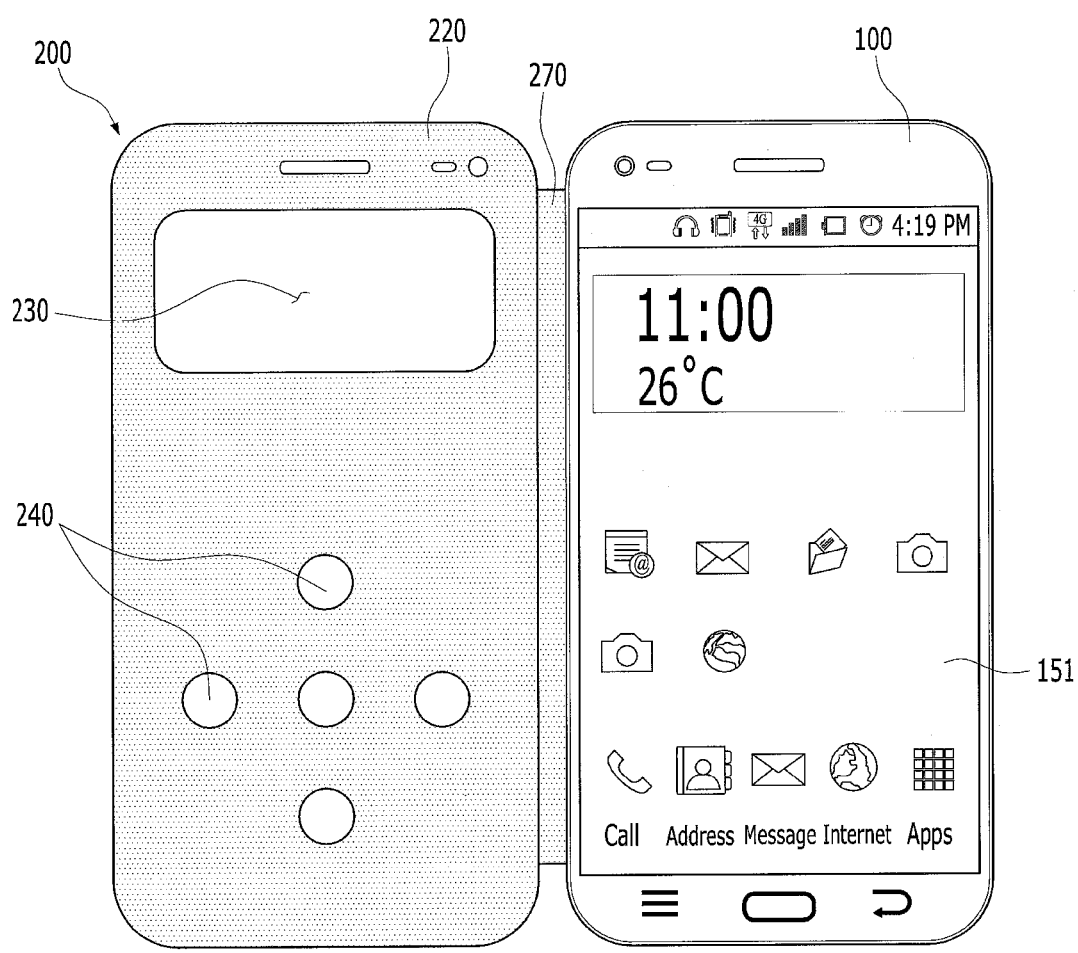
FIGS. 4 and 5 are diagrams illustrating a mobile terminal and a polio case in accordance with a second embodiment of the present disclosure.
Figure 5:
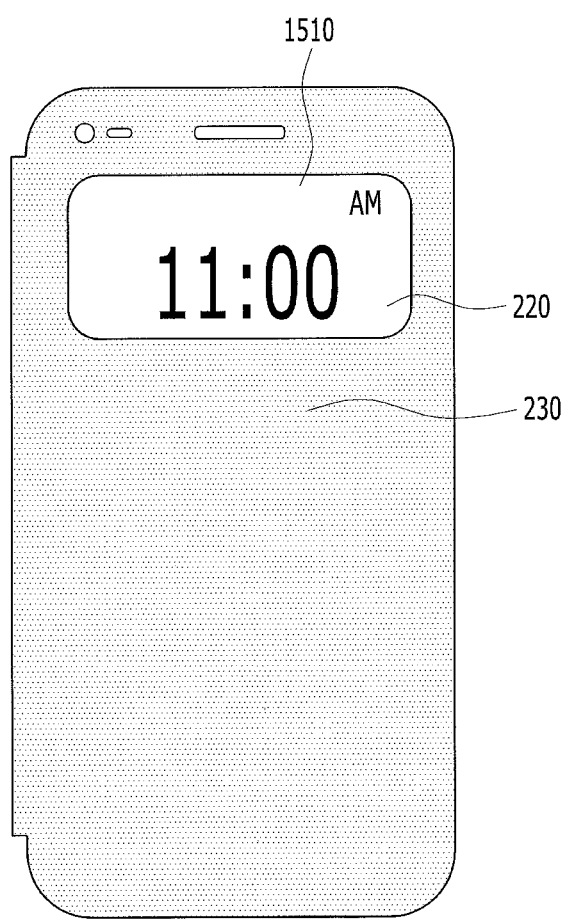

FIGS. 4 and 5 are diagrams illustrating a mobile terminal and a polio case 200 in accordance with a second embodiment of the present disclosure. A shape of a quick window 230 and a shape of a touch unit 240 in the quick cover 220 shown in FIG. 4 are different from the shape of the quick window 230 and the shape of the touch unit 240 shown in FIGS. 2 and 3.

The size and shape of the quick window display 1510 shown on the display unit 151 when the quick cover 220 of FIG. 3 is closed may be different from the size and shape of the quick window 1510 when the quick cover 220 of FIG. 5 is closed. In other words, the mobile terminal 100 recognizes that the quick cover 220 of FIG. 2 is different from the quick cover 220 of FIG. 4 through the touch unit 240 and then it may differentiate the size and shape of the quick window display 1510 based on the result of the recognition.

A touch sensor applies a different signal in accordance with a touched position and the controller of the mobile terminal 100 recognizes different information in accordance with the positions of the touch units 240 sensed by the touch sensor. As mentioned above, each of the touch units 240 has information on the size and shape of the quick window 230 and on an application which will be output on the quick window display 1510. As shown in FIGS. 2 through 5, the mobile terminal 100 outputs a different quick window display 1510 based on the positions and number of the touch units 240.

Figure 6:
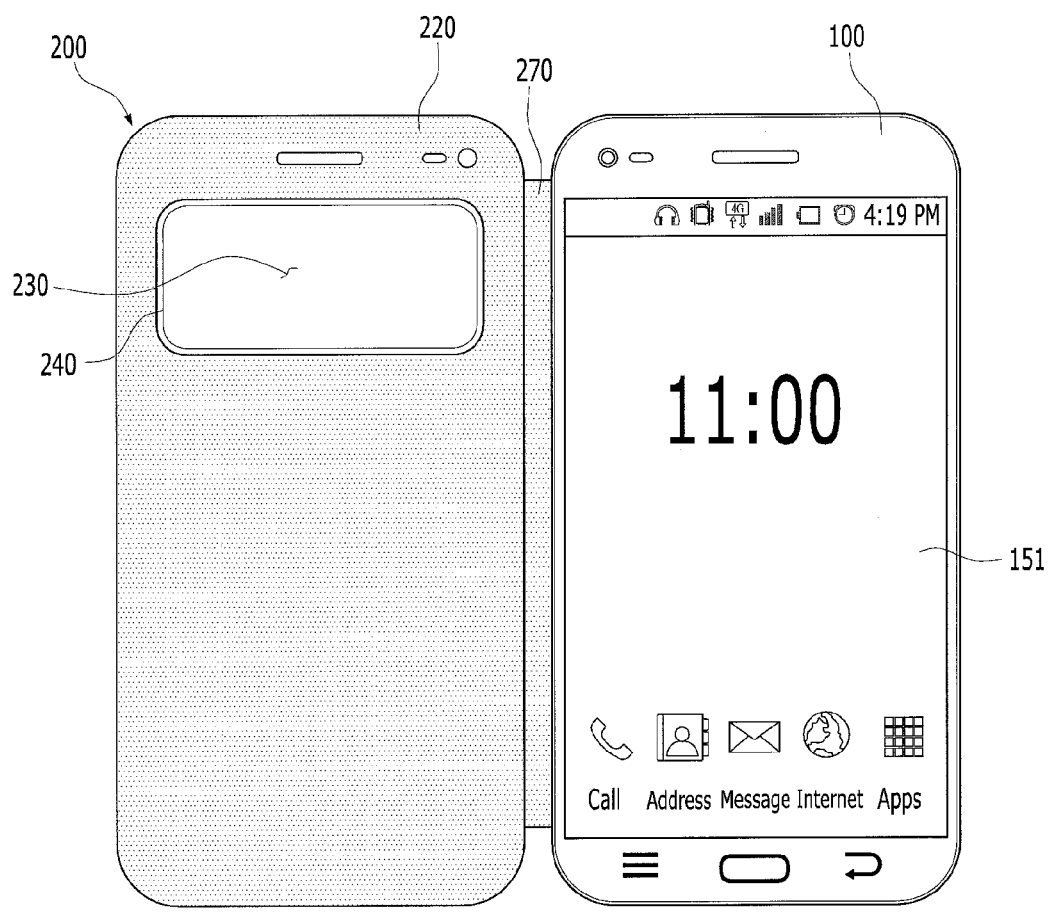
FIGS. 6 through 8 are diagrams illustrating a mobile terminal and a polio case in accordance with a third embodiment of the present disclosure.

FIG. 6 is a diagram illustrating a mobile terminal 100 and a polio case 200 in accordance with a third embodiment of the present disclosure. It is shown in FIG. 6 that a touch unit 240 is arranged around a quick window 230. The quick window 230 is provided in the touch units 240 sensed by the touch sensor which are arranged in a rectangular shape. A predetermined portion of the display unit 151 is activated as a quick window display 1510 and the other portion is inactivated. It is shown in FIG. 6 that the touch units 240 are continuously connected with each other but the touch units 240 can be arranged in some areas of 4 sides.

Figure 7:
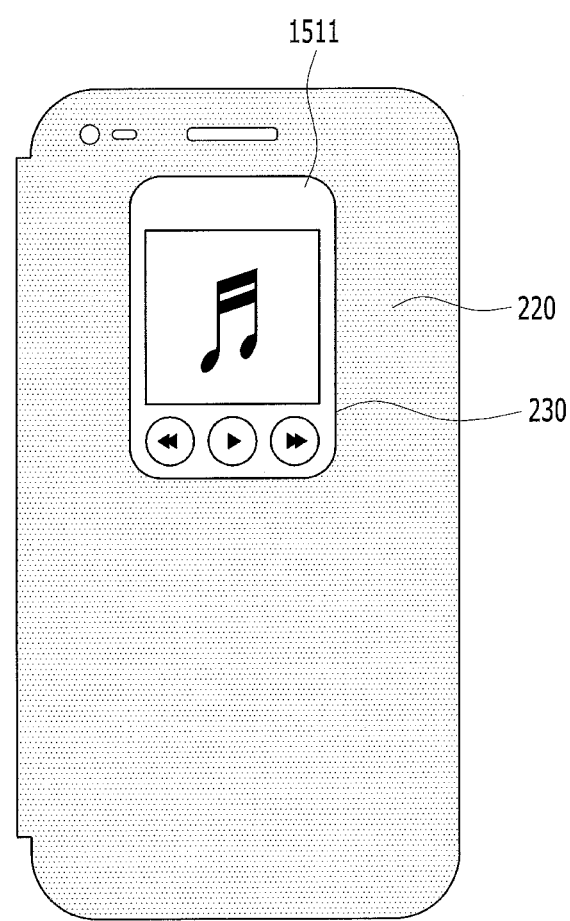

FIG. 7 illustrates variations of the mobile terminal 100 and the polio case 200. The touch unit 240 may not only transmit the information on the size and position of the quick window 230 but also store contents supposed to be output to the quick window 230 therein. For example, a multimedia player may be implemented or weather information, schedule alarms and check lists may be displayed as shown in FIG. 7.

Figure 8:
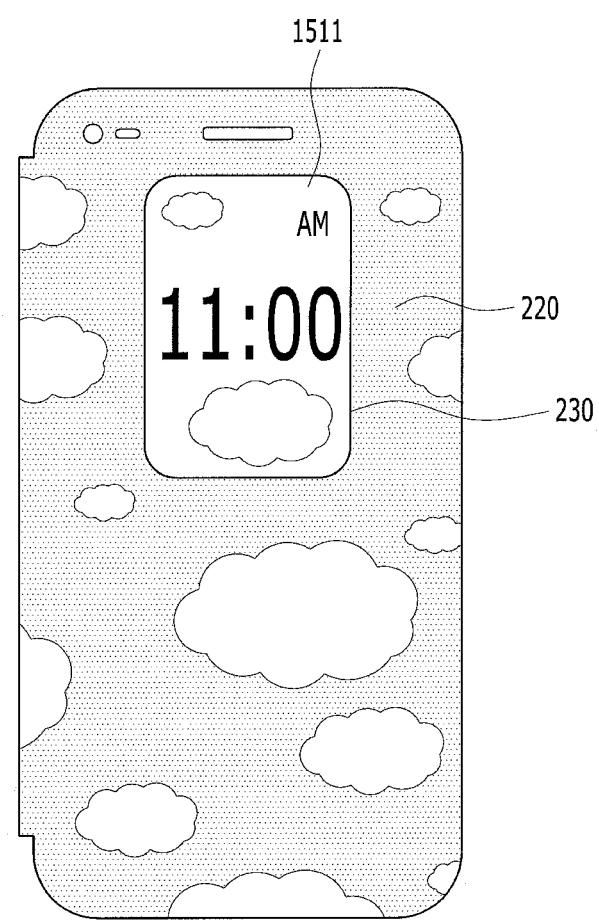

Alternatively, information on a color or design of the quick cover 220 shown in FIG. 8 may be transmitted to the mobile terminal 100 and a quick window display 1510 matching a color or design of the quick cover 220 may be realized. When there is a cloud design on the quick cover 220, a cloud design is output even to the quick window display 1510. When a color of the quick cover 220 is sky blue, sky blue may be output even to the quick window display 1510. A color of the output information as well as a background color of the quick window display 1510 may be output, with matching the color of the quick cover 220.

FIG. 9 is a graph to describe a scope of capacity change based on whether to be grounded or not. (a) shows capacity change when the quick cover 220 covers the front surface of the mobile terminal 100 in case only the touch unit 240 is provided in the quick cover 220 and (b) shows capacity change when the touch unit 240 is grounded.

In other words, capacity change is definitely shown when the touch unit 240 is grounded. Simply in case of providing only the touch unit 240, not so much capacity change is generated and the touch sensor could fail to sense the touch unit 240. It is preferred that the touch unit 240 is grounded.

Figure 10:
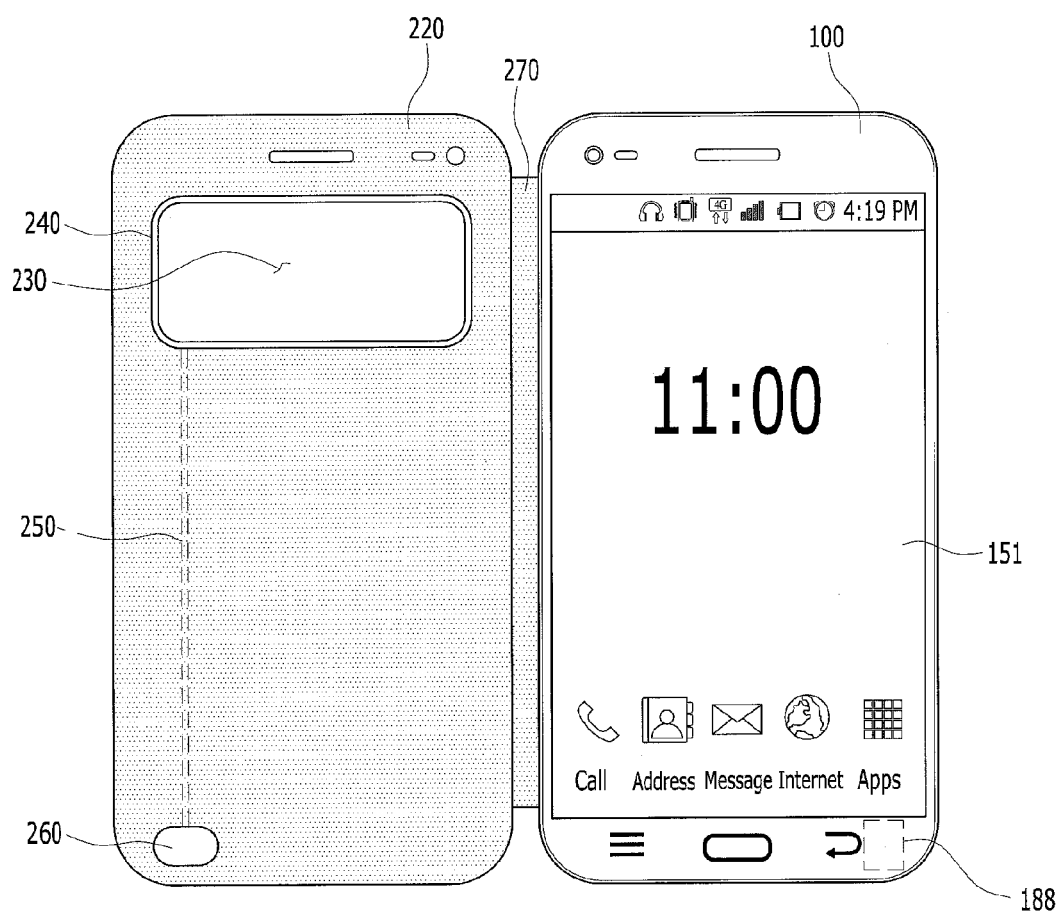
FIG. 10 is a diagram illustrating a mobile terminal and a polio case in accordance with a fourth embodiment of the present disclosure.

FIG. 10 is a diagram illustrating a mobile terminal 100 and a polio case 200 according to a fourth embodiment of the present disclosure. The polio case 200 in accordance with the embodiment further includes a ground unit 260 connected to the touch unit 240 in accordance with the embodiment shown in FIG. 6. The mobile terminal 100 includes a ground for grounding various electronic parts as well as an antenna. A ground-pad 188 connected to the ground is provided in a surface of the mobile terminal 100. Once the ground unit 260 of the quick cover 220 is touched on the ground-pad 188, the touch unit 240 connected to the ground unit 260 via a ground line 250 may be grounded and capacity change of the touch sensor is amplified.

The ground-pad 188 of the mobile terminal 100 may be formed in a bezel around the display 151 as shown in FIG. 10 and the ground unit 260 may be provided in a portion of an inner surface of the quick cover 220, which is touched with the ground pad 188.

Figure 11:
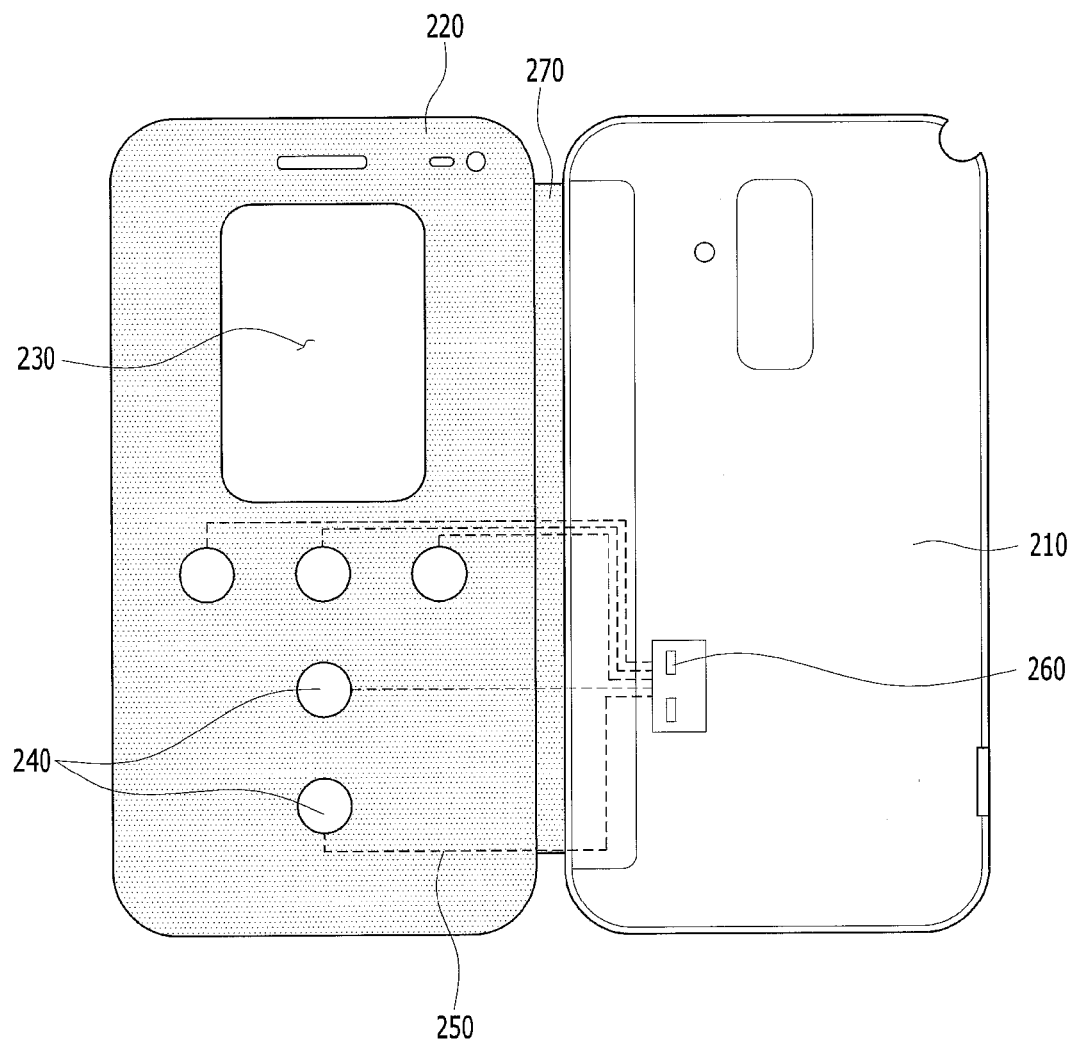
FIGS. 11 and 12 are diagrams illustrating a mobile terminal and a polio case in accordance with a fifth embodiment of the present disclosure.
Figure 12:
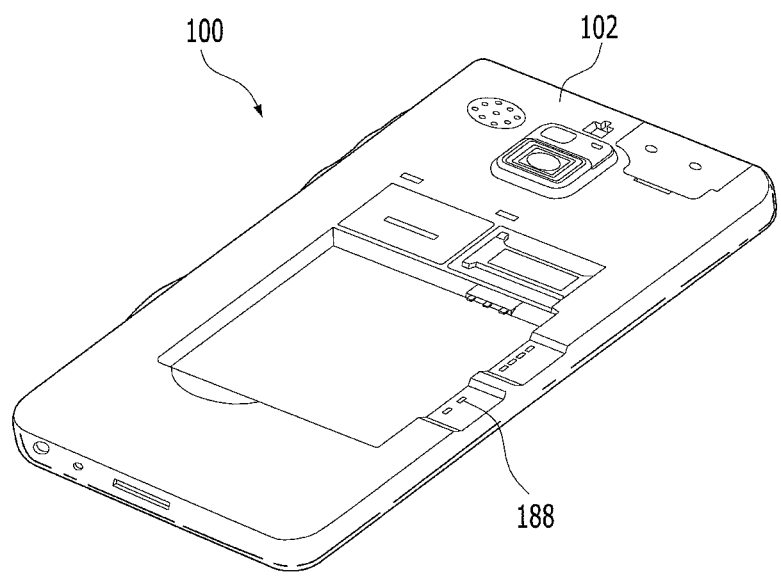

FIGS. 11 and 12 are diagrams illustrating a mobile terminal 100 and a polio case 200 in accordance with a fifth embodiment of the present disclosure. It is shown in the drawings that the ground unit 260 is formed in a back cover 210 not in the quick cover 220. A rear surface of the mobile terminal 100 may further include a ground pad 188 for electric connection to a back surface as shown in FIG. 12.

In this embodiment, the ground-pad 188 may be a terminal formed of an elastic material such as a C-clip.

Figure 13:
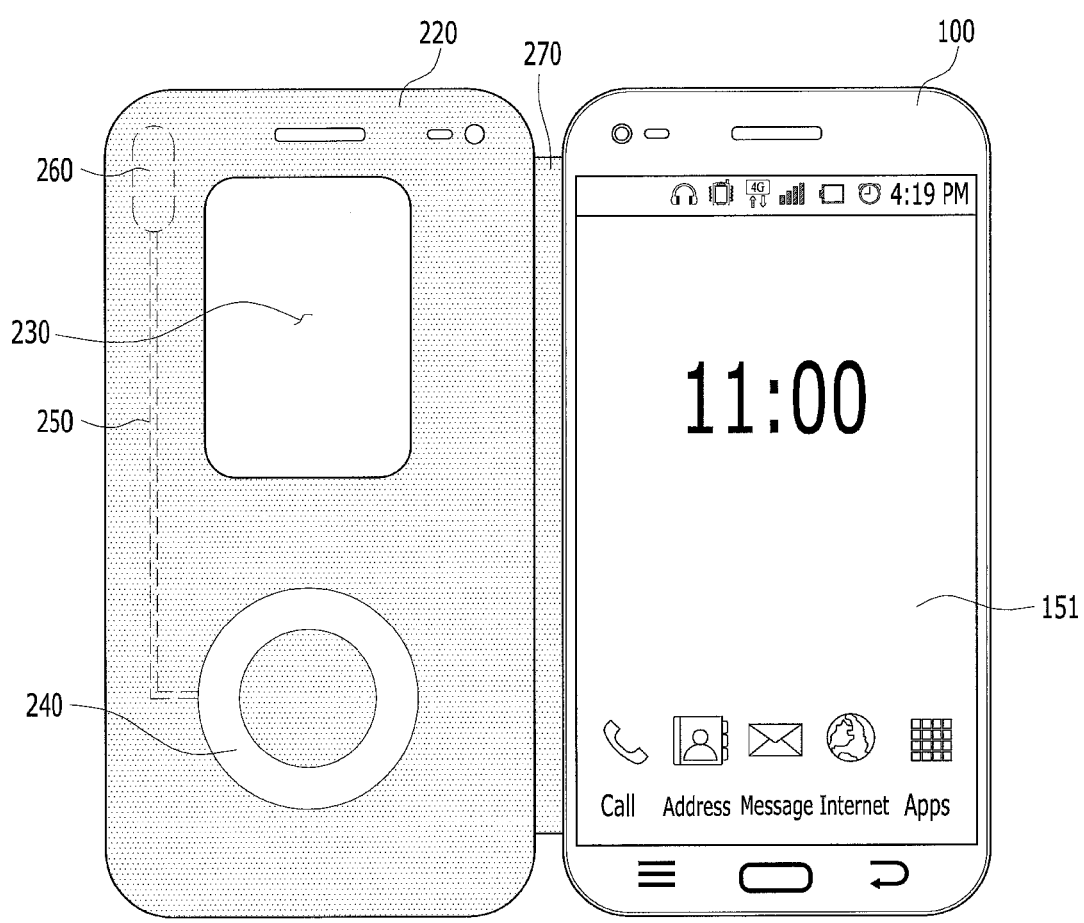
FIGS. 13 and 14 are diagrams illustrating a mobile terminal and a polio case in accordance with a sixth embodiment of the present disclosure.
Figure 14:
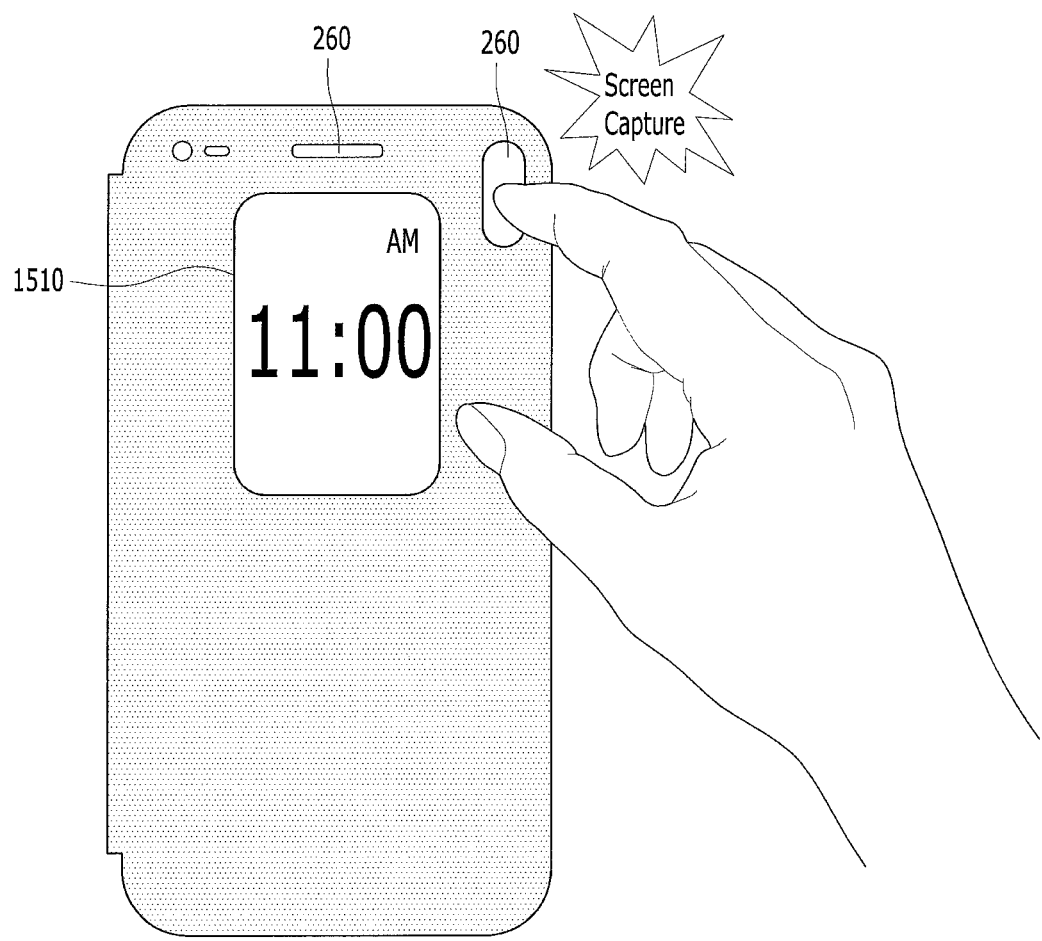
Figure 15:
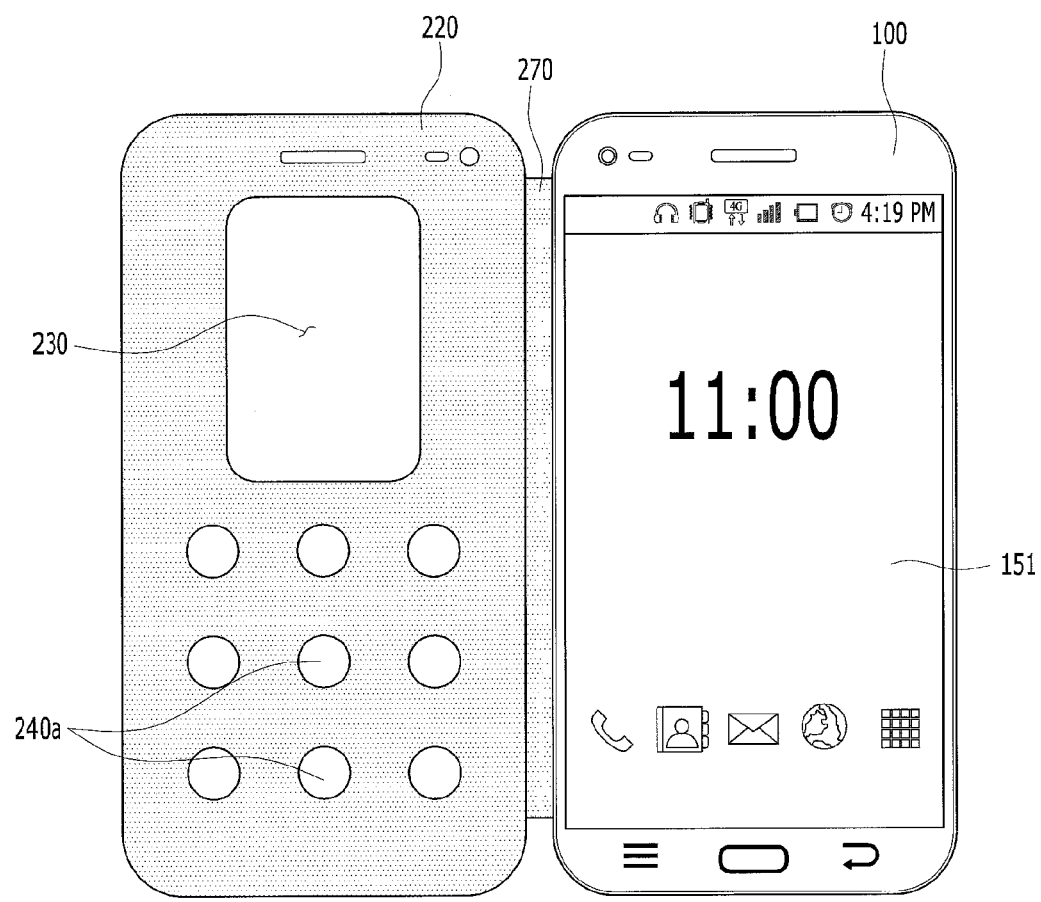
FIGS. 15 through 17 are diagrams illustrating a mobile terminal and a polio case in accordance with a seventh embodiment of the present disclosure.

FIGS. 13 and 14 are diagrams illustrating a mobile terminal 100 and a polio case 200 in accordance with a sixth embodiment of the present disclosure. Similar to the embodiment mentioned above, the ground of the touch unit 240 may be performed, using the ground provide in the mobile terminal 100. Alternatively, the user touches the touch unit 240 to ground capacity of the touch sensor provided in a portion corresponding to the touch unit 240 changes noticeably, using the effect which occurs when a human body part is touched on the touch unit 240, similar to the connection to the ground.

The ground unit 260 in accordance with the embodiment is provided in a front surface of the quick cover 220. The capacity of the touch sensor in contact with the touch unit 240 changes when the user's body part touches the touch the ground unit 260 and the mobile terminal 100 then recognizes a pattern of the touch unit 240.

Figure 16:
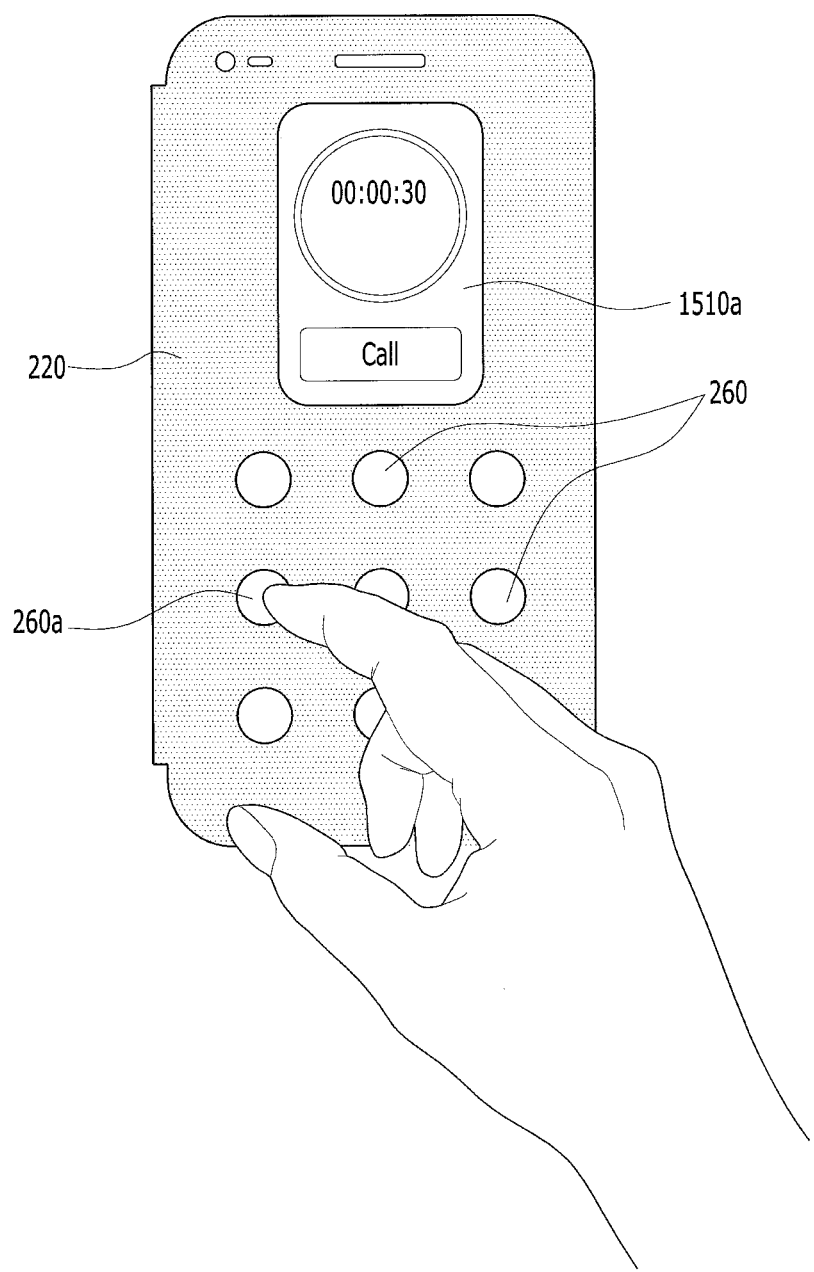
Figure 17:
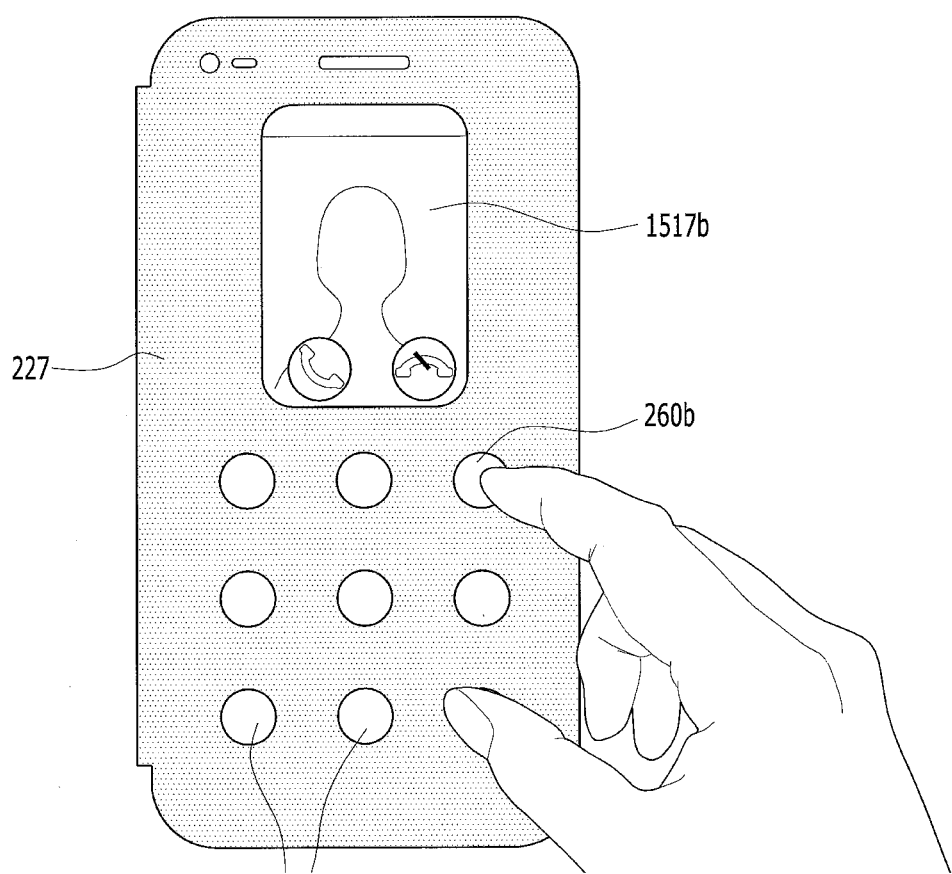

FIGS. 16 and 17 are diagrams illustrating a mobile terminal 100 and a polio case 200 in accordance with a seventh embodiment of the present disclosure. The polio case 200 in accordance with this embodiment a plurality of touch units 240 provided in an inner surface of a quick cover 220 and a ground unit 260 for allowing the user to touch each of the touch units 240. Accordingly, only capacity of a touch unit 240 connected to the ground unit 260 touched by the user's finger changes to input diverse commands.

As shown in FIG. 16, the user may answer a call when the user's body part touches a ground unit 260 provided in a left middle portion and disconnect a call when the user's body part touches a ground unit 260 provided in a right upper portion in reverse.

Even without opening the quick cover 220 every time, functions of the mobile terminal 100 may be controlled which can be used even with closing the quick cover 220 (e.g., calls and listening to music).

Each differentiated function may be implemented by recognizing a touch as a different command in accordance with the positions and number of the touch units 240 (e.g., the size and shape of the quick window 230 are output differently or a specific application is implemented as mentioned in the embodiment).

The touch unit 240 mentioned in the above embodiment may be employed to input a command for implementing a specific function or determining the shape of the quick window 230 as an established touch unit 240 basically mounted in the polio case 200. However, a different touch unit 240 for each person has to be applied for an operation which requires personal identity information (e.g., log-in) and the established touch unit 240 cannot be used.

Figure 18:
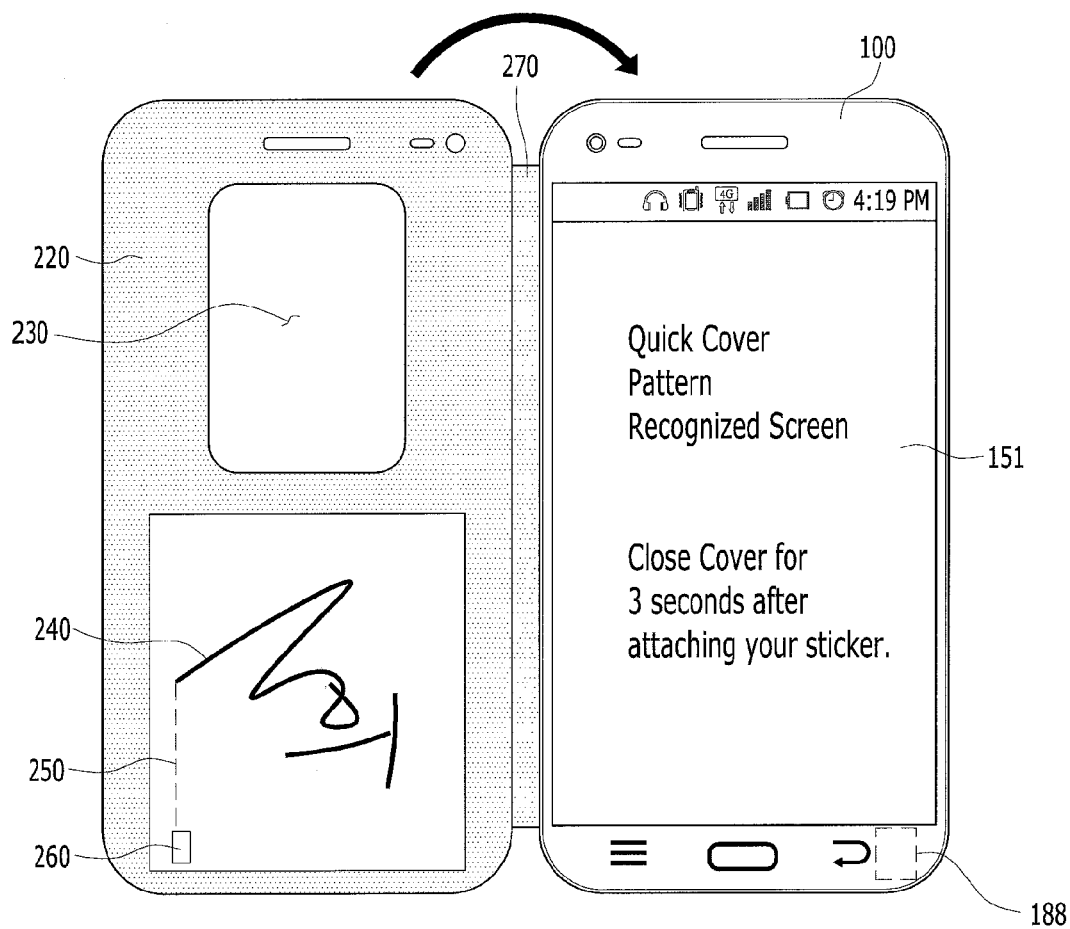
FIGS. 18 through 23 are diagrams a mobile terminal and a polio case in accordance with an eighth embodiment of the present disclosure.

Instead, the touch unit 240 having a unique shape such as a signature shown in FIG. 18 may be used as personal identity information. The touch unit 240 formed of a conductive material with a unique shape is realized and the touch unit 240 is disposed on an inner surface of the quick cover 220.

To enhance a recognition rate of the touch unit 240, a ground unit 260 electrically connected with the touch unit 240 may be further provided. The ground unit 260 contacts with the ground pad 188 of the mobile terminal 100 or a human body part contacts with the ground unit 260, only to ground the touch unit 240.

Figure 19:
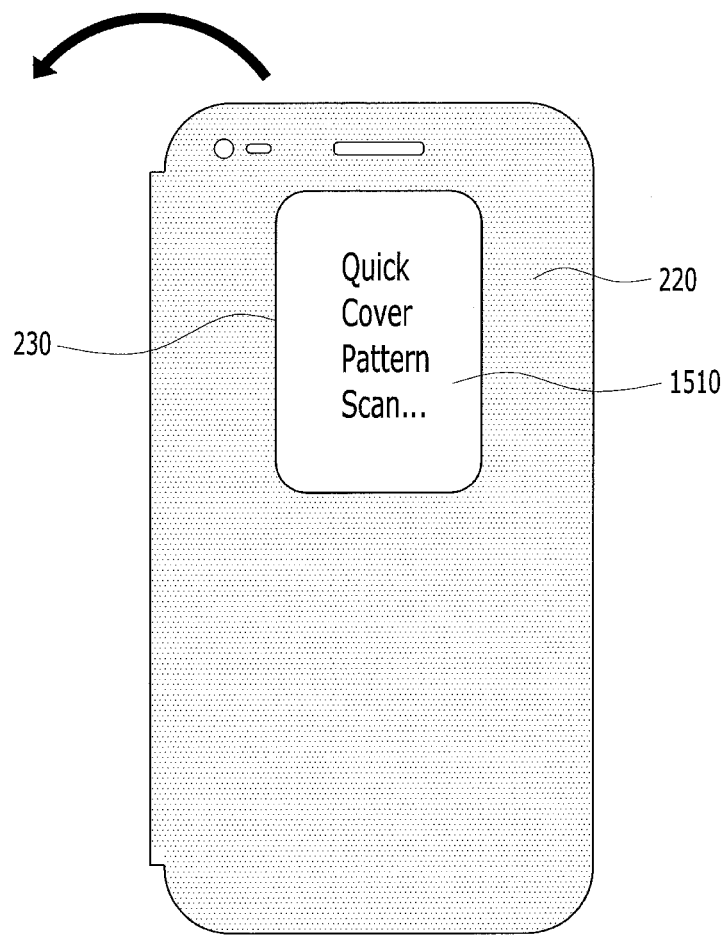

As shown in FIG. 18, a guide for closing the quick cover 220 to store a unique shaped pattern of the ground unit 260 in the mobile terminal 100 may be output to the display unit 151 of the mobile terminal 100. When the quick cover 220 is closed, the mobile terminal 100 may scan and store the unique-shaped pattern of the touch unit 240 as shown in FIG. 19.

Figure 20:
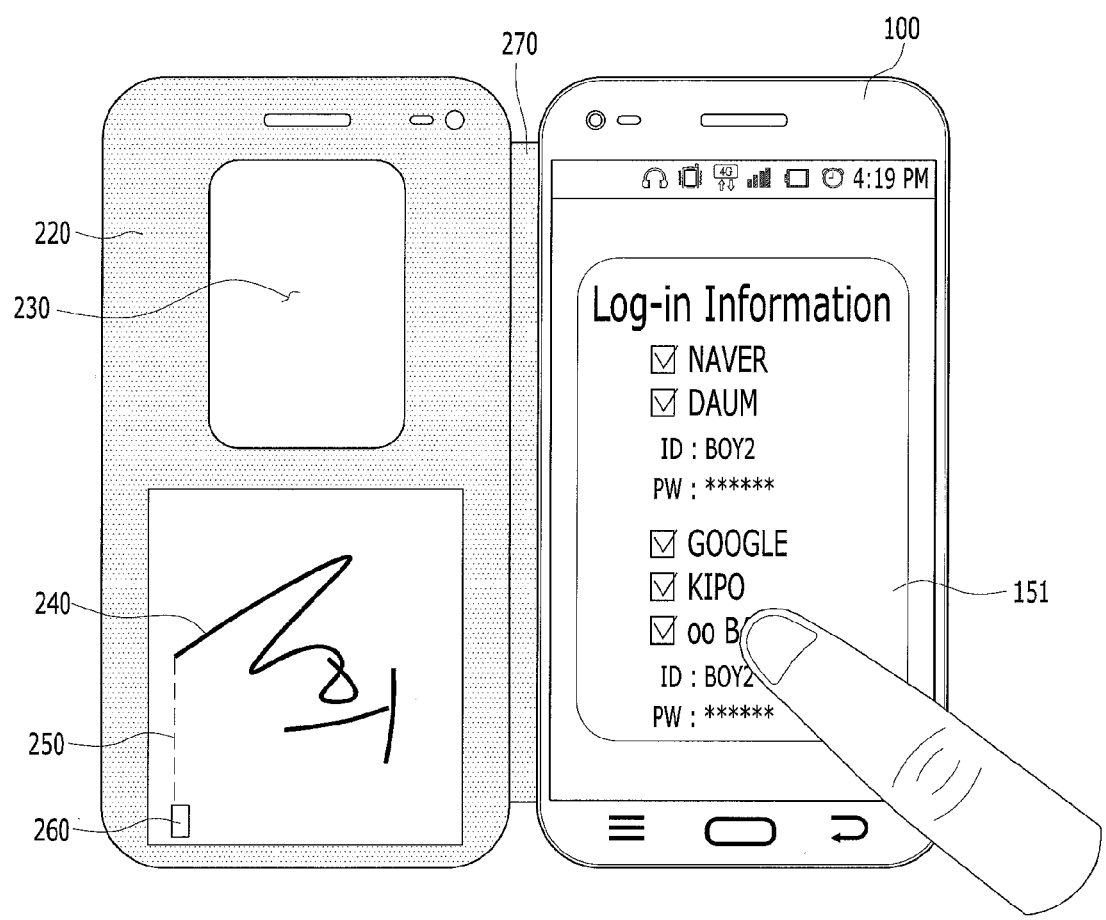

Next, log-in information of a website is input and recognized. The information is matched with the pattern of the touch unit as shown in FIG. 20. Log-in setting for a plurality of websites may be performed as shown in FIG. 20. It is asked whether the pattern of the touch unit provided in the quick cover 220 is used as log-in information when logging in each of websites. When the user replies to use the unique-shaped touch unit, the quick cover 220 may scan the unique touch unit and match the scanned touch unit with log-in information.

Figure 21:
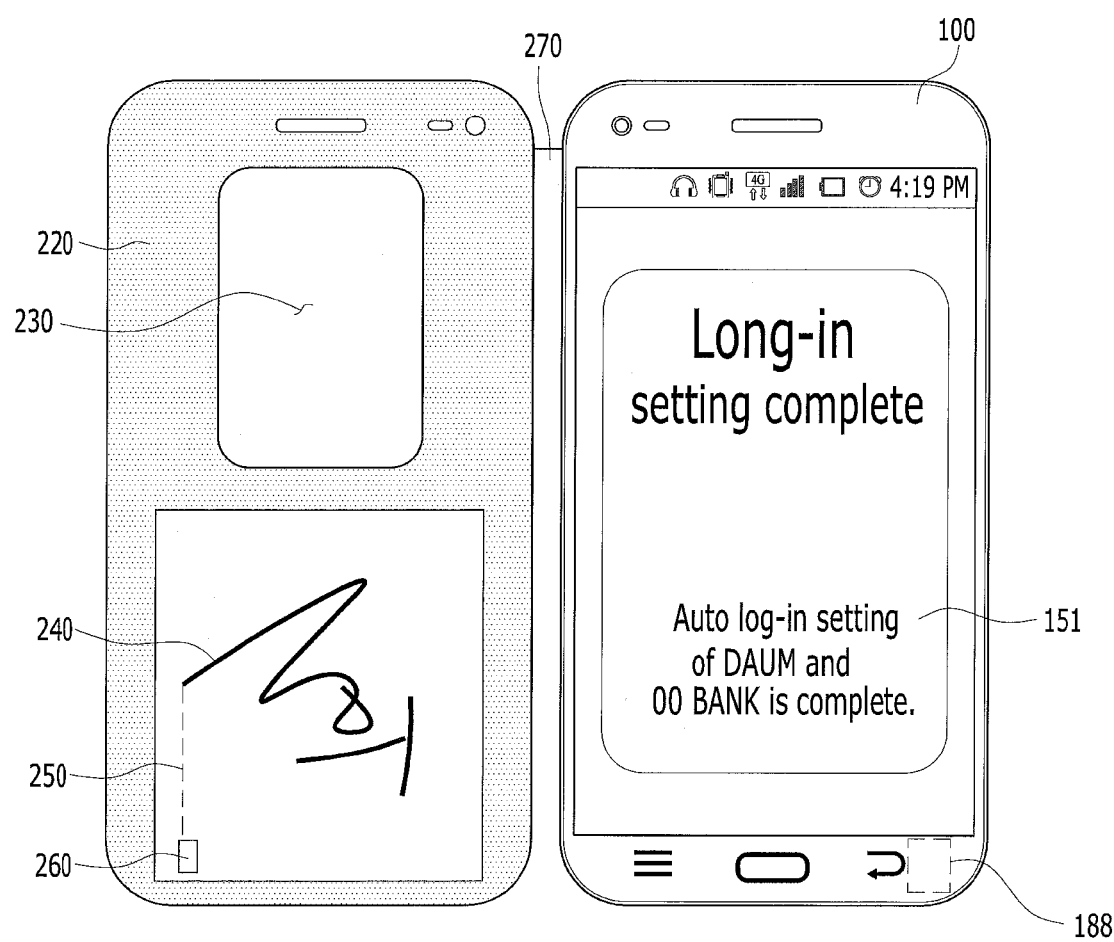
Figure 22:
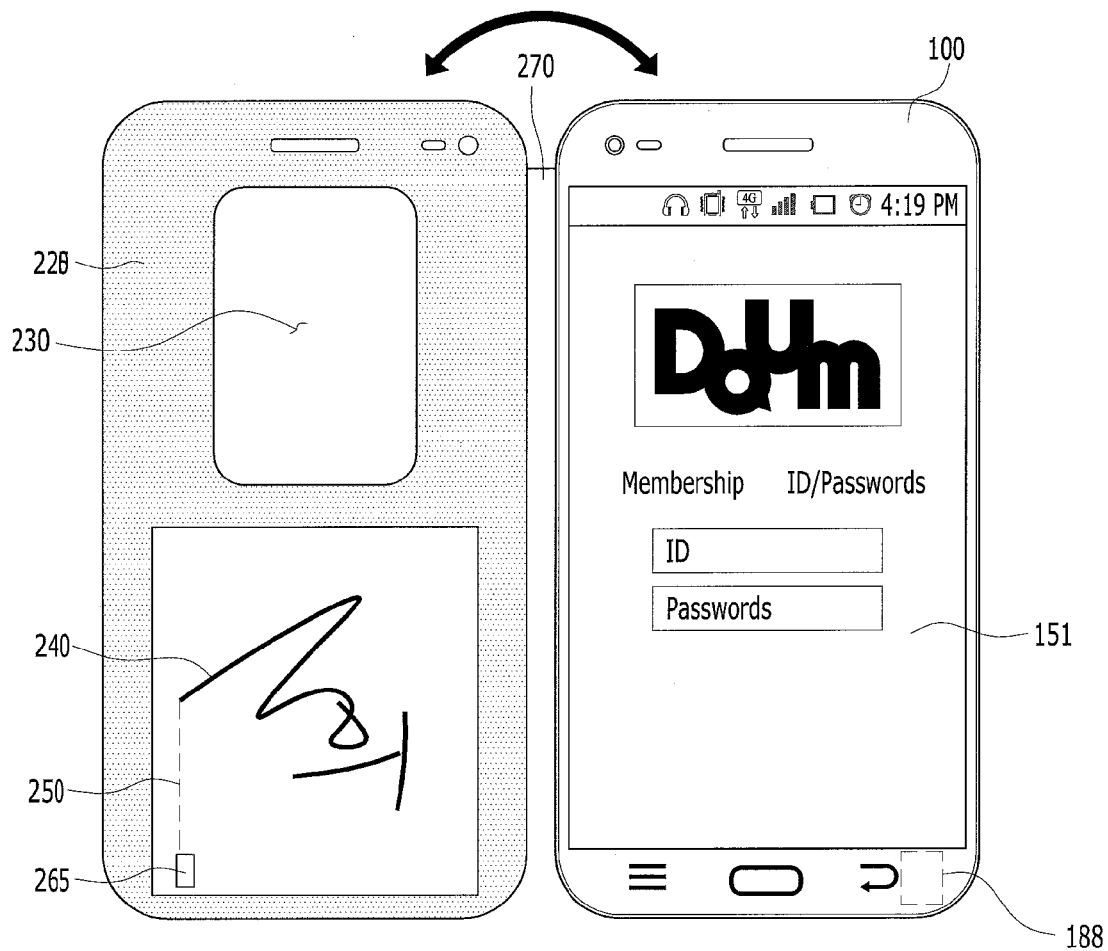
Figure 23:
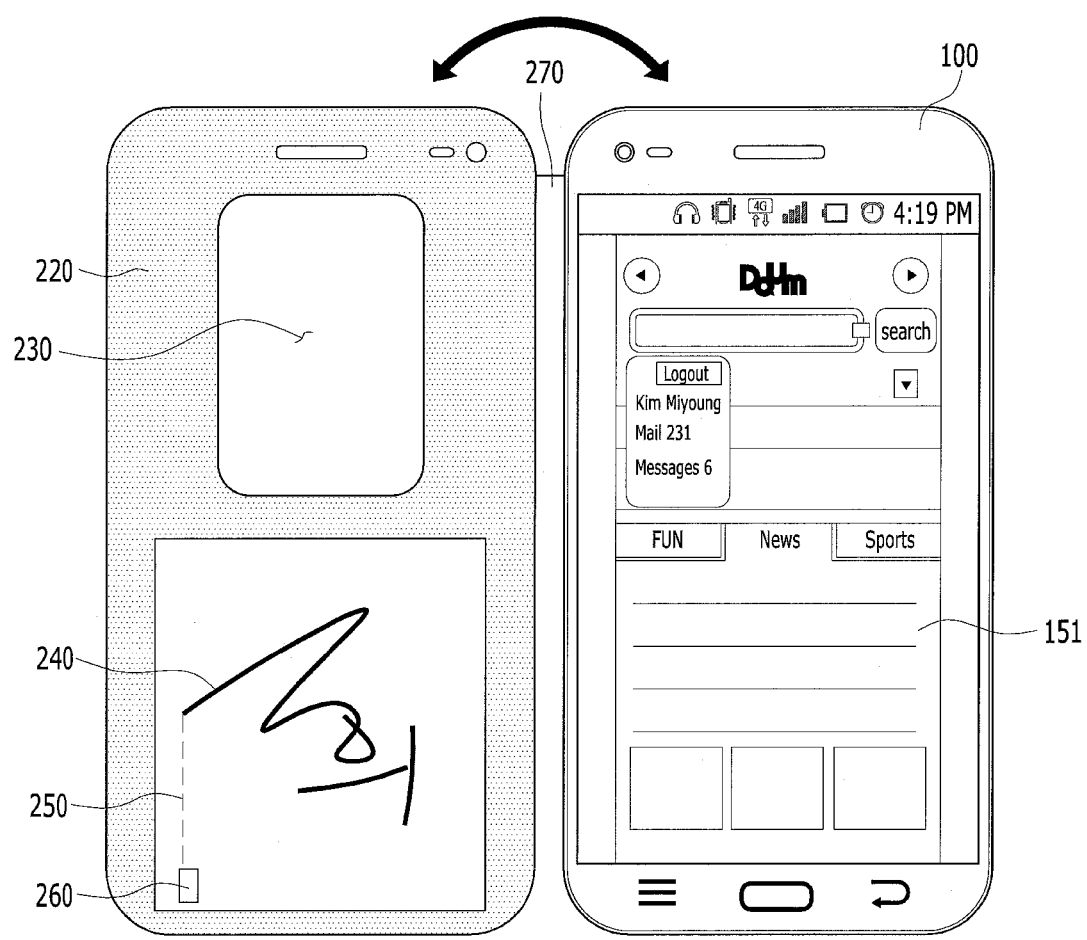

Once the log-in setting is completed as shown in FIG. 21, log-in is performed only by the closing of the quick cover 220 on a log-in screen shown in FIGS. 22 and 23.

Therefore, in at least on embodiment of the mobile terminal 100, the screen matching the shape of the quick cover 220 may be provided to the display unit 151.

Furthermore, no magnets are provided in the quick cover 220 according to the embodiments of the present disclosure and a signal can be applied to the mobile terminal 100, such that a screen output of the display unit 151 can be controlled. Accordingly, an error caused by the magnet provided in the conventional quick cover 220 may be reduced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

An object of the present disclosure is to provide a mobile terminal case including a quick cover, which may supply a touch signal with specific information to a display of a mobile terminal.

Another object of the present disclosure is to provide a display optimized for a quick cover which is closed, after interpreting a touch signal input from a touch unit provided in the quick cover.

To achieve these objects and other advantages and in accordance with the purpose of the disclosure, as embodied and broadly described herein, a polio case includes a back cover coupled to a rear surface of a mobile terminal; a quick cover connected to a predetermined portion of the back cover, to cover a front surface of the mobile terminal; a touch unit provided in an inner portion of the quick cover, the touch unit formed of a conductive material, wherein a touch sensor provided in the front surface of the mobile terminal contacts with the touch unit, when the quick cover is closed, and capacity of the touch sensor changes.

The polio case may further include a quick cover provided in an open portion of the quick cover, wherein arrangement and a size of the touch unit are differentiated based on a shape of the quick window.

The arrangement and the size of the touch unit may be differentiated based on a color of the quick cover and a design of the quick cover.

The touch unit may be provided around the quick window.

The polio case may further include a ground unit formed in an inner portion of the quick cover or the back cover to be connected to a ground of the mobile terminal when coupled to the mobile terminal.

The polio case may further include a ground unit formed in an outer portion of the quick cover or an outer portion of the back cover to be electrically connected with the touch unit, wherein the touch unit is grounded when a user's finger touches the ground unit and capacity of a touch sensor provided in the mobile terminal changes.

The touch unit may include user identity information.

In another aspect of the present disclosure, a mobile terminal includes a housing having an electric control unit provided therein; a display unit coupled to a front surface of the case, the display unit comprising a touch sensor; and a controller for activating a first area of the display unit to output a screen and for inactivating a second area, when the touch sensor senses a plurality of touch inputs in a specific positions.

The controller may control a size and a shape of a portion of the screen output in the first area to be differentiated based on the positions and number of the touch inputs.

The controller may control at least one of a color, a design or contents of the screen partially output to the display unit to be differentiated based on the positions and number of the touch inputs.

The mobile terminal may further include a ground provided in the case; and a ground terminal connected to the ground, with being exposed to the case.

In a further aspect of the present disclosure, a mobile terminal includes a case having an electric control unit provided therein; a display unit coupled to a front surface of the case, the display unit comprising a touch sensor; and a controller for implementing a preset function when the touch sensor recognizes a plurality of touch inputs in a specific position.

The preset function may include a log-in function which requires user identity and an unlocking function.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A case for a mobile terminal comprising:
   a back cover to couple to a first surface of the mobile terminal;
   a quick cover to couple to the back cover, and a back surface of the quick cover contacting at least a portion of a second surface of the mobile terminal at a closed position;
   a quick window at the quick cover;
   at least one touch unit at the back surface of the quick cover, the at least one touch unit being formed of a conductive material; and
   at least one ground unit at a front surface of the quick cover, the ground unit connected to the at least one touch unit via a ground line,
   wherein when the quick cover is at the closed position, the at least one touch unit contacts a touch sensor at the second surface of the mobile terminal,
   wherein when a body part of a user touches the at least one ground unit a capacity changes of at least one point of the touch sensor where the at least one touch unit contacted the touch sensor, and
   wherein an arrangement of the at least one touch unit at the back surface of the quick cover includes information of a shape of the quick window.

2. The case of claim 1, wherein the arrangement and a size of the at least one touch unit is based on at least one of a color of the quick cover and a design of the quick cover.

3. The case of claim 1, wherein the at least one touch unit is provided around the quick window.

4. The case of claim 1, further comprising:
   a ground unit at the quick cover to couple to a ground of the mobile terminal.

5. The case of claim 1, further comprising:
   a ground unit at the back cover to couple to a ground of the mobile terminal.

6. The case of claim 1, further comprising:
   a ground unit at the quick cover to electrically connect to the touch unit, wherein the touch unit is to be grounded when a touch member touches the ground unit and the capacity of the touch sensor at the mobile terminal changes.

7. The case of claim 1, further comprising:
a ground unit at the back cover to electrically connect to the touch unit,
wherein the touch unit is to be grounded when a touch member touches the ground unit and the capacity of the touch sensor at the mobile terminal changes.

8. The case of claim 1, wherein the touch unit includes user identity information.

9. The case of claim 1, wherein each of the at least one ground unit connects to each of the at least one touch unit.

10. A mobile terminal comprising:
a case;
a display unit at the case, the display unit including a touch sensor and a screen; and
a controller to activate a first area of the screen and to inactivate a second area of the screen during the touch sensor senses at least a plurality of touch inputs,
wherein the at least a plurality of touch inputs placed at the second area;
wherein the controller determines a size, a shape, a color, a design and contents of the first area of the screen based on positions and total numbers of the plurality of touch inputs, and
wherein the controller controls the first area of the screen when a capacity of at least one point of the touch sensor where sensing the at least one of plurality of touch inputs changes.

11. The mobile terminal of claim 10, wherein the controller to display content at the first area of the screen without displaying content at the second area of the screen when the touch sensor senses the plurality of touch inputs.

12. The mobile terminal of claim 10, wherein the characteristics include positions and total numbers of the plurality of touch inputs.

13. The mobile terminal of claim 10, further comprising:
a ground at the housing; and
a ground terminal to couple to the ground.

14. The mobile terminal of claim 10, wherein the controller to implement a preset function based on a touch input at the touch sensor.

* * * * *